United States Patent [19]
Enoki et al.

[11] Patent Number: 4,781,994
[45] Date of Patent: Nov. 1, 1988

[54] FIBER-REINFORCED CEMENT MATERIAL AND MOLDED ARTICLE COMPRISING HARDENED PRODUCT THEREOF

[75] Inventors: Toshio Enoki; Yasuo Sakaguchi, both of Iwaki, Japan

[73] Assignee: Kureha Kagaku Kogyo Kabushiki Kaisha, Tokyo, Japan

[21] Appl. No.: 98,555

[22] Filed: Sep. 21, 1987

[30] Foreign Application Priority Data

Sep. 25, 1986 [JP] Japan ................. 61-226915

[51] Int. Cl.$^4$ ................................ C04B 7/35
[52] U.S. Cl. ..................... 428/703; 106/99; 428/902
[58] Field of Search ............ 106/99; 428/703, 408, 428/902

[56] References Cited

U.S. PATENT DOCUMENTS

| | | | |
|---|---|---|---|
| 4,070,199 | 1/1978 | Downing et al. | 106/99 X |
| 4,111,710 | 9/1978 | Pairaudeau et al. | 106/99 X |
| 4,132,555 | 1/1979 | Bauable | 106/99 X |
| 4,302,414 | 11/1981 | Curnow et al. | 106/99 X |
| 4,363,666 | 12/1982 | Johnson et al. | 106/99 X |
| 4,414,031 | 11/1983 | Studinka et al. | 106/99 X |

FOREIGN PATENT DOCUMENTS 0195422  9/1986  European Pat. Off. .

*Primary Examiner*—Nancy A. B. Swisher
*Attorney, Agent, or Firm*—Oblon, Fisher, Spivak, McClelland & Maier

[57] ABSTRACT

A cement material containing polyarylene thioether fibers and carbon fibers as reinforcing fiber and molded articles comprising hardened products thereof are disclosed.

The fiber reinforced cement material is curable in an autoclave and the molded articles comprising the hardened products thereof are excellent in deflection property, impact strength, tensile strength and bending strength.

6 Claims, No Drawings

FIBER-REINFORCED CEMENT MATERIAL AND MOLDED ARTICLE COMPRISING HARDENED PRODUCT THEREOF

BACKGROUND OF THE INVENTION

The present invention relates to a cement material containing polyarylene thioether fibers and carbon fibers as reinforcing material, as well as molded articles comprising hardened products thereof. Particularly, the present invention relates to a fiber-reinforced cement material curable in an autoclave, as well as molding products comprising hardened products thereof.

Since mortar cement or concrete is poor in strength against bending or impact as molded articles such as wallboards to be used as building materials, roofing materials, pipes for various purposes, plates to be used as pile materials, pillars, etc., cement materials, reinforced with asbestos fibers have been used for obtaining these molded articles.

Fiber-reinforced cement materials have the following advantageous features:

(1) improved in tensile strength, bending strength and impact strength, (2) improved in deflection property, (3) improved in cracking resistance, etc.

However, it has been found in recent years that asbestos exhibits carcinogenicity and the use thereof has presented a serious problem in view of public pollution. Although it has been attempted to use glass fibers for the reinforcing fibers as a substitute for the asbestos fibers, the glass fibers involve a drawback of reactivity with alkaline cement thereby tending to cause deterioration with time.

Further, although there have also been proposed other fiber-reinforced cement materials such as those containing organic fibers, for example, cellulose, polyolefin, polyester, polyamide (including polyaromatic amide), polyvinyl alcohol, etc., such fiber-reinforced cement materials are not satisfactory in alkali resistance or heat resistance and involve a problem of deterioration with time or thermal deterioration during autoclave curing (as described in "Fibers and Industry", vol. 41, June, p 14–18, etc.).

While on the other hand, fiber-reinforced cement material using carbon fibers has been developed in recent years in view of the heat resistance and alkali resistance thereof (as disclosed in "Nikkei New Material", 1985, November, p 125–130, etc.). However, although carbon fibers have sufficient tensile strength and bending strength, as well as modulus of elasticity, since carbon fibers are poor in elongation and toughness, no satisfactory effects for improving the deflection property and the impact strength of the molded articles have yet been obtained.

In order to overcome the foregoing problems, the present inventors have made an extensives for various kinds of fibers as substitutes for asbestos fibers and, as the result of the study for the alkali resistance, heat resistance, flame resistance and the economical merit of various kinds of fibers, it has been found that polyarylene thioether fibers can substitute for the asbestos fibers as the reinforcing fibers for cements. That is, the present inventors have found that a cement material reinforced with polyarylene thioether fibers is capable of providing molded articles having an improved deflection property and impact strength and is hardly deteriorated during the autoclave curing required for obtaining dimensionally stable molded articles.

However, the present inventors have also found that the remarkable effect for improving the tensile strength or bending strength can only be attained when polyarylene thioether fibers of specially enhanced modulus prepared by complicated stretching and heat treatments (thus requiring extremely high cost) are adopted. By the way, moduli of general grade polyarylene thioether are usually lower than that of the matrix component (cement component). However, as a result of the present inventors study, it has been found that a fiber-reinforced cement material containing an adequate amount of both of polyarylene thioether fibers and carbon fibers as the reinforcing fibers is curable in an autoclave and capable of providing molded articles improved in tensile strength and bending strength as well as in deflection property and impact strength due to the synergistic effect derived from both of the fibers. The present invention has been accomplished based on these findings.

SUMMARY OF THE INVENTION

In a first aspect of the present invention, there is provided a fiber-reinforced cement material comprising (A) 100 parts by volume of a cement component, (B) 0.5 to 20 parts by volume of polyarylene thioether fibers and (C) 0.5 to 20 parts by volume of carbon fibers.

In a second aspect of the present invention, there is provided a molded article comprising hardened products of the fiber-reinforced cement material comprising (A) 100 parts by volume of a cement component, (B) 0.5 to 20 parts by volume of polyarylene thioether fibers and (C) 0.5 to 20 parts by volume of carbon fibers.

DETAILED DESCRIPTION OF THE INVENTION

The fiber-reinforced cement material according to the present invention comprises (A) 100 parts by volume of a cement component, (B) 0.5 to 20 parts by volume of polyarylene thioether fibers and (C) 0.5 to 20 parts by volume of carbon fibers.

The term "parts by volume" for indicating the composition ratio in the present invention represents the values obtained by dividing the values for the weight by those of the true respectively.

The matrix component, that is, the cement component in the fiber-reinforced cement material according to the present invention comprises hydraulic cement. The hydraulic cement can include, for example, portland cement, alumina cement, blast furnace cement, fly ash cement, white cement (containing inorganic binder such as calcium silicate cured through hydrating reaction) and they are used alone or as a mixture of two or more of them.

For the purpose of adjusting the physical property of the matrix component and extending the volume for the cost down, etc., inorganic fillers such as sands, pebbles, pearlite, vermiculites, ashes, silas balloons, silicic sands, fly ashes, lime stones, slugs, calcium carbonates, clays, micas, wollastonites and silica may be incorporated and may be used within a range of 0 to 90 parts by volume and, preferably, 0 and 5 parts by volume based on 100 parts by volume of the cement component. Addition of the inorganic filler in excess of 90 parts by volume is not preferred since the strength of the matrix component becomes insufficient.

The reinforcing fibers used in the fiber-reinforced cement material according to the present invention are polyarylene thioether fibers (hereinafter simply referred to as PATE fibers) and carbon fibers.

PATE fibers are those obtained from a polymer having repeating units $+Ar-S+$ (Ar: arylene group including substituted arlylene group). Among them, those fibers of polymers only consisting of p-phenylene groups as the arylene group, or polymers having p-phenylene groups as the main constitutional unit for the arylene group are preferred in terms of the alkali resistance and heat resistance and from an economical point of view. As areylene groups other than p-phenylene groups, m-phenylene group

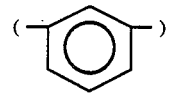

alkyl-substituted phenylene group

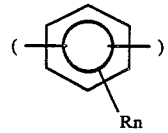

(R: alkyl group; n: integer of 1-4), 4,4'-diphenylene ketone group

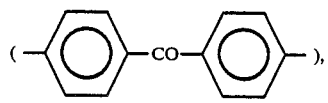

4,4'-diphenylene sulfone group

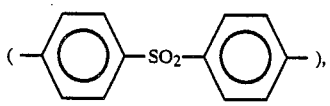

4,4'-biphenylene group

4,4'-diphenylene ether group

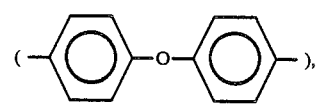

napthalene group

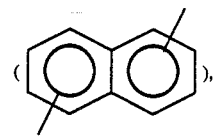

etc. are mentioned.

Furthermore, a particularly excellent molded article can be obtained by using, as the reinforcing fiber, fibers prepared from a block copolymer comprising 95 to 70 mol % of the repeating unit having the p-phenylene group

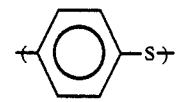

5 to 30 mol % of the repeating unit having m-phenylene group

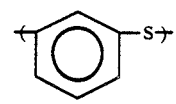

(for example, as disclosed in Japanese Patent Application No. 59-1343633 (1984), JA 86014228A), since they are excellent in the compatibility with the cement component (matrix).

As for the properties of PATE fibers, those having a melting point of 150° to 400° C., preferably, 200° to 350° C., a tensile strength of 10 to 200 kg/mm$^2$, preferably, 20 to 100 kg/mm$^2$, an elongation of not less than 5%, preferably, not less than 10% and the tensile modulus of 100 to 1,200 kg/mm$^2$, preferably, 200 to 1,000 kg/mm$^2$ are appropriate in view of the reinforcing effect and from an economical point of view. Those fibers having not more than 5% of elongation (fibers having extremely high modulus of elasticity) may be insufficient in the effect for improving the deflection property.

Suitable diameter for the PATE fibers is generally 0.5 to 100 μm, preferably, 2 to 30 μm in view of the reinforcing effect and the fiber dispersibility.

The reinforcing PATE fibers may be short fibers or long fibers, and may be multi-filaments or mono-filaments. Further, the fibers may be in the form of mats, cloths and non-woven fabrics. In the case of using short fibers, those with 1–50 mm, particularly, 3 to 20 mm of length are preferred in view of the reinforcing effect and workability. Furthermore, those fibers having an aspect ratio of not less than 10 and, particularly, not less than 20 are preferred. The aspect ratio of not more than 10 is not preferred since the reinforcing effect is poor.

The amount of the PATE fibers to be incorporated is, preferably, 0.5 to 20 parts by volume based on 100 parts by volume of the cement component(matrix component) (A). The amount within the range from 1 to 10 parts by volume is particularly preferred. However, the total amount of the PATE fibers and the reinforcing fibers (C) (carbon fibers, detailed later) to be incorporated is, preferably, not more than 25 parts by volume based on 100 parts by volume of the cement component (A). If the amount is less than 0.5 part by volume, the effect for improving the impact strength is insufficient.

While on the other hand, if the amount exceeds 20 parts by volume, or if the total amount of the PATE fibers and the reinforcing fibers (C) to be incorporated exceeds 25 parts by volume, the molding of a fiber-reinforced cement material becomes difficult and undesirable voids tend to develop in molded articles.

It is an object of the present invention to improve the deflection property and the impact strength, as well as improve the tensile strength, and the bending strength of the final molded articles comprising hardened product of the fiber-reinforced cement material by the combined use of the PATE fibers and carbon fibers as the reinforcing fibers.

The carbon fibers used in the present invention may be of pitch-based type or PAN-based type. From an economical point of view, pitch-based carbon fibers are generally advantageous. A suitable diameter of the carbon fibers is generally within a range from 0.5 to 100 $\mu$m and, preferably, from 2 to 30 $\mu$m in view of the effect for improving the tensile strength and the bending strength of the molded articles.

The reinforcing carbon fibers may be short fibers or long fibers. The fibers may be in the form of mats, cloths, non-woven fabrics. In the case of using short fibers, those having 1 to 50 mm and, particularly, 3 to 20 mm of length are preferred in view of the reinforcing effect and workability. Furthermore, those fibers having an aspect ratio of not less than 10 and, particularly not less than 20 are preferred. The aspect ratio of less than 10 is not preferred since the reinforcing effect is poor. The amount of the carbon fibers to be incorporated to the cement component is, preferably, from 0.5 to 20 parts by volume based on 100 parts by volume of the cement component (A) (matrix component). The amount within the range from 1 to 10 parts by volume is particularly preferred. However, the total amount of the reinforcing fibers (C) (carbon fibers) and the reinforcing fibers (B) (PATE fibers) incorporated is preferably not more than 25 parts by volume based on 100 parts by volume of the cement component (A). The amount of less than 0.5 parts by volume is insufficient for the effect of improving the tensile strength and the bending strength of the molded articles. While on the other hand, it is not preferred that the amount exceeds 20 parts by volume or the total amount of carbon fibers and the PATE fibers exceeds 25 parts by volume, since the molding operation becomes difficult and voids tend to develop in the molded articles.

In addition to the PATE fibers and carbon fibers, it is also possible to add a small amount of pulp, cotton, linen, rayon, polyvinyl alcohol fibers, nylon fibers, acrylic fibers, polyester fibers, metal fibers, etc. in order to improve the workability and mechanical properties.

For obtaining a molded articles of excellent physical property, it is necessary to mold and cure a green mold in which cement, reinforcing fibers, inorganic fillers optionally added as described above and water required for the hydrating reaction are mixed and dispersed as uniform as possible. For obtaining a mold uniformly mixed, it is also useful to use a small amount of a processing aid effective for such mixing, although it is not essential to add the processing aid into the cement material according to the present invention. As suitable processing aids for improving the mixing and dispersion, (a) water soluble polymer such as polyvinyl alcohol, cellulose, alkylether, polyalkylene oxide, polyalkylene oxide ether, polyacrylamide and polyvinylpyrrolidone and (b) organic sulfonates such as sodium lignin sulfonate and sodium naphthalenesulfonate are exemplified. The processing aid is used preferably in an amount within a range from 0.01 to 5 parts by weight based on 100 parts by weight of the cement component (A). The effect is insufficient when the amount is less than 0.01 part by weight, and the molded article may possibly be collapsed during curing when the amount exceeds 5 parts by weight.

Water is essentially required for the hardening by hydration of the fiber-reinforced cement material according to the present invention and for maintaining the shape of the green mold. The amount for use is within a range from 5 to 500 parts by weight based on 100 parts by weight of the cement component (A) in view of the retention of shape and moldability.

The molded article according to the present invention may be a foamed article. As the foaming agent, aluminum powder can be used, for example.

Further, chemicals for adjusting the hardening rate may be blended as well.

The fiber-reinforced cement material according to the present invention may be shaped into flat plate, corrugated panel, pipe, pillar, etc. by the molding process such as extrusion, dry process, casting, screening or other ordinary cement molding processes.

In the case of molding a green mold by extrusion, a wet mixture is prepared at first by uniformly mixing reinforcing fibers, cements, inorganic fillers, water (containing processing aids) and, optionally, other fillers. In this case, water may be added simultaneously with or subsequently to the preparation of a dry mixture of the components other than water. The wet mixture is then supplied from a hopper to a kneading extruder and molded into a green mold by extrusion. This method is particularly suitable to a case where short fibers are used as the reinforcing fibers. There is another method in which a wet mixture of the components other than the reinforcing fibers is supplied from a hopper to an extruder, while introducing reinforcing fibers from an intermediate opening (a vent) into the extruder at a substantially constant feed rate, cutting the fibers and kneading the fibers and the other components uniformly in the extruder and then extruding them to form a green mold. As the extruder employed in this method, a parallel twin-screw kneading extruder is preferred to a single-screw extruder since the feed rate of the fibers can be easily kept constant. This method is suitably to a case where the PATE fibers and the carbon fibers to be introduced into the extruder are long fibers and continuous fiber. In the case of short fibers, it is difficult to feed constantly from the intermediate opening. However, since the constant feed is possibly by utilizing an auxiliary feeder or the like, the short fibers can also be used in this method.

In the case of molding a green mold by the dry process, starting cements, reinforcing fibers and, as required, other fillers are mixed in a dry process to carry out preliminary molding and, thereafter, necessary water is added to obtain a green mold. This method is suitable to a case where a short fibers are used as the reinforcing fibers.

In the case of molding a green mold by casting, cements, inorganic fillers, reinforcing fibers, water (containing processing aids) and, as required, other fillers are uniformly mixed and cast with pressure into a mold to obtain a green mold. This process is suitable for short fibers. In the case where the reinforcing fibers are in the shape of long fibers, mats, cloths, non-woven fabrics, etc., a green mold can be molded by alternately layering a wet mixture prepared by uniformly mixing cements, inorganic fillers, water (containing processing aids) and, as required, other fillers, and layers of the fiber reinforcing materials of the shape as described above in a mold.

In the case of molding a green mold by sheet-forming, a slurry prepared by uniformly mixing cements, inorganic fillers, reinforcing fibers, a relatively great amount of water containing processing aids (preferably within a range from 100 to 500 parts by weight based on 100 parts by weight of cements) and, as required, other fillers is cast on a screen and dehydrated by filtration to obtain a molding product. In the case where reinforcing fibers are in the shape of long fibers, mats, cloths, etc., a green mold can be obtained by alternately layering a plurality of matrix layers and reinforcing fiber layers on the screen, just similarly to the casting process.

In the case of preparing a foamed article, molding can be carried out by using an appropriate foaming agent (for example, aluminum powder), as well as by blowing gas bubbles into a slurry of a mixture of cements, reinforcing fibers and other optional components or admixing a foaming liquid.

A molded article of the fiber-reinforce cement material excellent in the mechanical strength (particularly, bending strength), heat resistance and durability can be obtained from the thus molded green mold by effecting dehydrating reaction of the cement component by room temperature curing or autoclave curing by ordinary methods. Autoclave cured products are particularly preferred in the case of obtaining a molded article required to have a high dimensional stability, for example, curtain walls for use in building exteriors, etc. The autoclave curing is usually carried out in a high pressure vessel at a temperature of about 150° to 200° C. under a high steam pressure for 1 to 50 hours.

The cement material reinforced with polyarylene thioether fibers and carbon fibers having alkali resistance and high heat resistance according to the present invention can be cured in an autoclave and a molded article comprising a hardened product of the cement material has excellent mechanical properties, as well as shows less deterioration with time. Accordingly, the molded article according to the present invention is suitable to building wall material, roofing material, pile material, various kinds of pipes, etc.

The present invention will be explained more precisely while referring to the following non-limitative examples.

EXAMPLES 1-3 and COMPARATIVE EXAMPLES 1-7

(1) Starting materials used (i) Cement component (A)
  rapid-hardening portland cement
(ii) Reinforcing fibers (B)
  PATE fibers: poly-p-phenylene thioether fibers
  diameter: 22–25 $\mu m$
  length: 6 mm
  density 1.37 $g/cm^3$
  elongation: 20–25%
  tensile modulus of elasticity: 600–700 $kg/mm^2$
(iii) Reinforcing fibers (C)
  carbon fibers: KCF #C 1045T (made by Kureha Kagaku Co.)
  diameter: 18 $\mu m$
  length: 4.5 mm
  density: 1.65 $g/cm^3$
  tensile modulus of elasticity: 3,000 $kg/mm^2$
(iv) Other additives
  mixing agent: methyl cellulose (2) Molding method Reinforcing fibers, rapid hardening portland cement and methyl cellulose (0.63 g based on 100 g of the cement) were previously dry-blended and the blend was supplied to a five liter volume omnidirectional mixer. Water (42 g based on 100 g of the cement) was finally supplied and kneaded for 10 min. The product was cast into a mold and molded into a shape of plate of 160 mm L×40 mm W×10 mm H. After one day, the product thus molded was released from the mold, transferred to an autoclave and cured at 180° C. for 5 hours heating with steam of 10 atm. The cured product was allowed to stand at a room temperature and subjected to physical property test after 14 days.

(3) Physical property test

Using a 5 ton tensilon tester, a bending stress-deflection curve was recorded by a centralized load method for the thus obtained molded sample under the condition of spun=10 cm, cross head speed=0.5 mm/min, to determine the maximum bending stress and the corresponding deflection (maximum deflection). Further, the molded sample was cut into 65 mm L×12.5 mm W×10 mm H and an IZOD impact strength (without notch) was measured at room temperature.

The results are collectively shown in Table 1.

As can be seen from Table 1, those products reinforced only with carbon fibers showed low improvement in the maximum deflection and the IZOD impact strength, and those products reinforced only with the PATE fibers showed less improvement in the bending strength. While on the other hand, those products reinforced by the combined use of the PATE fibers and the carbon fibers had remarkably improved maximum deflection and IZOD impact strength as well as high bending strength.

TABLE 1

| | | Fiber (B) | | Fiber (C) | | | Izod impact | | |
| --- | --- | --- | --- | --- | --- | --- | --- | --- | --- |
| | Cement component (A) | Type (length) | Parts by volume (*1) | Type (length) | Parts by volume (*1) | Max deflection (mm) | strength (with no notch) (kgcm/cm) | Max bending strength ($kg/cm^2$) | Remarks |
| Example | | | | | | | | | |
| 1 | Rapid-hardening portland cement | PATE fiber (6 mm) | 1.0 | carbon fiber (4.5 mm) | 3.1 | 1.3 | 4.1 | 220 | |
| 2 | Rapid-hardening portland cement | PATE fiber (6 mm) | 2.1 | carbon fiber (4.5 mm) | 3.2 | 1.6 | 7.1 | 210 | |
| 3 | Rapid-hardening | PATE fiber | 3.2 | carbon fiber | 3.2 | 1.9 | 9.2 | 200 | |

TABLE 1-continued

| Cement component (A) | Fiber (B) Type (length) | Fiber (B) Parts by volume (*1) | Fiber (C) Type (length) | Fiber (C) Parts by volume (*1) | Max deflection (mm) | Izod impact strength (with no notch) (kgcm/cm) | Max bending strength (kg/cm$^2$) | Remarks |
|---|---|---|---|---|---|---|---|---|
| | portland cement | (6 mm) | | (4.5 mm) | | | | |
| Comparative Example | | | | | | | | |
| 1 | Rapid-hardening portland cement | — | — | carbon fiber (4.5 mm) | 3.1 | 1.0 | 2.0 | 200 | |
| 2 | Rapid-hardening portland cement | PATE fiber (6 mm) | 0.2 | carbon fiber (4.5 mm) | 3.1 | 1.0 | 1.9 | 200 | |
| 3 | Rapid-hardening portland cement | PATE fiber (6 mm) | 21 | carbon fiber (4.5 mm) | 3.1 | 0.1 | <0.5 | 60 | (Molding difficult, a lot of voids) |
| 4 | Rapid-hardening portland cement | PATE fiber (6 mm) | 3.1 | — | — | 3.0 | 7.1 | 125 | |
| 5 | Rapid-hardening portland cement | PATE fiber (6 mm) | 3.1 | carbon fiber (4.5 mm) | 0.2 | 3.0 | 7.0 | 120 | |
| 6 | Rapid-hardening portland cement | PATE fiber (6 mm) | 3.1 | carbon fiber (4.5 mm) | 21 | 0.1 | <0.5 | 50 | (Molding difficult, a lot of voids) |
| 7 | Rapid-hardening portland cement | PATE fiber (6 mm) | 13 | carbon fiber (4.5 mm) | 13 | 0.1 | <0.5 | 30 | (Molding difficult, a lot of voids) |
| Control | Rapid-hardening portland cement | — | — | — | — | 0.2 | <0.5 | 105 | |

(*1) Value based on 100 parts by volume of the cement component (A)

What is claimed is:

1. A fiber-reinforced cement material comprising
(A) 100 parts by volume of a cement component,
(B) 0.5 to 20 parts by volume of polyarylene thioether fibers and
(C) 0.5 to 20 parts by volume of carbon fibers.

2. The fiber-reinforced cement material according to claim 1, wherein the total amount of said polyarylene thioether fibers and said carbon fibers is not more than 25 parts by volume based on 100 parts by volume of said cement component.

3. The fiber-reinforced cement material according to claim 1 wherein said polyarylene thioether fibers are those of polymer having the unit

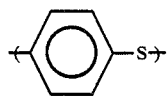

as the main constitutional repeating unit.

4. A molded article comprising hardened product of a fiber-reinforced cement material comprising
(A) 100 parts by volume of a cement component,
(B) 0.5 to 20 parts by volume of polyarylene thioether fibers and
(C) 0.5 to 20 parts by volume of carbon fibers.

5. The molded article according to claim 4, wherein the total amount of said polyarylene thioether fibers and said carbon fibers is not more than 25 parts by volume based on 100 parts by volume of said cement component.

6. The molded article according to claim 4, wherein said polyarylene thioether fibers are those of polymer having the repeating unit

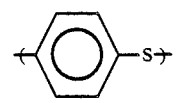

as the main constitutional repeating unit.

* * * * *